(12) United States Patent
Cheng et al.

(10) Patent No.: US 12,468,719 B2
(45) Date of Patent: Nov. 11, 2025

(54) TIME SERIES FORECASTING

(71) Applicant: Google LLC, Mountain View, CA (US)

(72) Inventors: Xi Cheng, Kirkland, WA (US); Amir H. Hormati, Seattle, WA (US); Lisa Yin, Redmond, WA (US); Umar Syed, Edison, NJ (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/323,766

(22) Filed: May 25, 2023

(65) Prior Publication Data

US 2023/0297583 A1 Sep. 21, 2023

Related U.S. Application Data

(63) Continuation of application No. 16/986,861, filed on Aug. 6, 2020, now Pat. No. 11,693,867.

(60) Provisional application No. 63/026,573, filed on May 18, 2020.

(51) Int. Cl.
*G06F 16/2458* (2019.01)
*G06F 16/22* (2019.01)

(52) U.S. Cl.
CPC ........ *G06F 16/2477* (2019.01); *G06F 16/221* (2019.01); *G06F 16/2282* (2019.01)

(58) Field of Classification Search
CPC ........ G06F 16/903; G06F 17/18; G06F 16/28; G06F 16/243; G06F 16/24578
USPC .......................................................... 707/769
See application file for complete search history.

(56) References Cited

U.S. PATENT DOCUMENTS

| | | | |
|---|---|---|---|
| 11,120,361 B1 * | 9/2021 | Januschowski | ........ G06N 20/00 |
| 11,232,466 B2 * | 1/2022 | Frank | ................. G06Q 30/0203 |
| 11,693,867 B2 | 7/2023 | Cheng et al. | |
| 11,693,987 B2 | 7/2023 | Sun et al. | |

(Continued)

FOREIGN PATENT DOCUMENTS

| | | |
|---|---|---|
| CN | 107358317 A | 11/2017 |
| JP | 2016044029 A | 4/2016 |
| WO | 2017203601 A1 | 11/2017 |

OTHER PUBLICATIONS

USPTO. Office Action relating to U.S. Appl. No. 16/986,861, filed Sep. 29, 2022.

(Continued)

*Primary Examiner* — Hung T Vy
(74) *Attorney, Agent, or Firm* — Shumaker & Sieffert, P.A.

(57) ABSTRACT

A method for time series forecasting includes receiving a time series forecasting query from a user requesting the data processing hardware to perform a plurality of time series forecasts. Each time series forecast is a forecast of future data based on respective current data. Simultaneously, for each time series forecast of the plurality of time series forecasts requested by the time series forecasting query, the method includes training a plurality of models for the respective time series forecast. The method also includes determining which model of the plurality of models best fits the respective time series forecast and forecasting the future data based on the determined best fitting model and the respective current data. The method also includes returning, to the user, the forecasted future data for each of the plurality of time series forecasts request by the timer series forecasting query.

20 Claims, 7 Drawing Sheets

(56) References Cited

U.S. PATENT DOCUMENTS

| | | | |
|---|---|---|---|
| 2011/0066579 A1* | 3/2011 | Ikada | G06N 3/02 706/21 |
| 2013/0238399 A1* | 9/2013 | Chipley | G06Q 10/06375 705/7.37 |
| 2016/0055440 A1 | 2/2016 | Komatsu | |
| 2016/0300252 A1 | 10/2016 | Frank et al. | |
| 2017/0193371 A1* | 7/2017 | Shen | G06F 16/24568 |
| 2019/0121566 A1 | 4/2019 | Gold et al. | |
| 2019/0156253 A1* | 5/2019 | Malyack | G06N 5/022 |
| 2019/0384762 A1* | 12/2019 | Hill | G06F 16/2272 |
| 2020/0125941 A1* | 4/2020 | Gold | G06F 3/067 |
| 2020/0143246 A1* | 5/2020 | Li | G06F 16/26 |
| 2020/0278976 A1 | 9/2020 | Fan et al. | |
| 2020/0311615 A1* | 10/2020 | Jammalamadaka | G06N 20/20 |

OTHER PUBLICATIONS

Chinese Office Action for the related Application No. 202180036340. 8, dated Jul. 29, 2023, 6 pages.

Shaub, David: "Fast and accurate yearly time series forecasting with Forecast combinations", International Journal of Forecasting, vol. 36, Issue 1, pp. 116-120, published Mar. 31, 2020, 5 pages.

First Examination Report from counterpart Indian Application No. 202247071625 dated Feb. 3, 2023, 6 pp.

International Search Report and Written Opinion of International Application No. PCT/US2023/025657 dated Jul. 5, 2021, 9 pp.

Notice of Intent to Grant, and translation thereof, from counterpart Japanese Application No. 2022570355 dated Aug. 8, 2024, 5 pp.

Notification of Reason for Refusal, and translation thereof, from counterpart Japanese Application No. 2022570355 dated Mar. 13, 2025, 6 pp.

Response to Communication Pursuant to Rules 161(1) and 162 EPC dated Jan. 3, 2023, from counterpart European Application No. 21728727.5, filed Jun. 27, 2023, 13 pp.

Response to Communication Pursuant to Rules 161(1) and 162 EPC dated Jan. 3, 2023, from counterpart European Application No. 21728727.5, filed Jun. 29, 2023, 9 pp.

Response to First Examination Report dated Feb. 3, 2023, from counterpart Indian Application No. 202247071625 filed May 15, 2023, 11 pp.

Response to Office Action dated Jul. 29, 2023, from counterpart Chinese Application No. 202180036340.8 filed Dec. 11, 2024, 12 pp.

Response to Summons to Attend Oral Proceedings pursuant to Rule 115(1) EPC dated May 13, 2024, including Main Request, from European Patent Application No. 21728727.5] filed Mar. 18, 2025, 11 pp.

Second Office Action from counterpart Chinese Application No. 202180036340.8 dated Dec. 17, 2023, 15 pp.

Summons to Attend Oral Proceedings Pursuant to Rule 115(1) EPC from counterpart European Application No. 21728727.5 dated May 13, 2024, 10 pp.

Prosecution History from U.S. Appl. No. 16/986,861, now issued U.S. Pat. No. 11,693,867, dated Feb. 3, 2022, through Feb. 23, 2023, 91 pp.

Office Action, and translation thereof, from counterpart Japanese Application No. 2024-157520 dated Jul. 3, 2025, 8 pp.

Response to Office Action, and translation thereof, dated Jul. 3, 2025, from counterpart Japanese Application No. 2024-157520 filed Oct. 7, 2025, 18 pp.

* cited by examiner

TIME SERIES FORECASTING

CROSS REFERENCE TO RELATED APPLICATIONS

This U.S. patent application is a continuation of, and claims priority under 35 U.S.C. § 120 from, U.S. patent application Ser. No. 16/986,861, filed on Aug. 6, 2020, which claims priority under 35 U.S.C. § 119(e) to U.S. Provisional Application 63/026,573, filed on May 18, 2020. The disclosures of these prior applications are considered part of the disclosure of this application and are hereby incorporated by reference in their entireties.

TECHNICAL FIELD

This disclosure relates to forecasting time series.

BACKGROUND

Forecasting future trends based on historical data can provide useful information for a multitude of different applications. The need for accurate forecasting of future trends has grown as vast amounts of data becomes readily available and users seek to leverage accurate forecasts to gain competitive advantages. When forecasting future data trends, several underlying components may impact variations in data. These variations can make a time component very difficult to accurately forecast. Many machine learning models aim to accurately forecast future trends incorporating the time component.

SUMMARY

One aspect of the disclosure provides a method for time series forecasting. The method includes receiving, at data processing hardware, a time series forecasting query from a user. The time series forecasting query requests the data processing hardware to perform a plurality of time series forecasts. Each time series forecast is a forecast of future data based on respective current data. For each time series forecast of the plurality of time series forecasts requested by the time series forecasting query, the method includes training simultaneously, by the data processing hardware, a plurality of models for the respective time series forecast. The method also includes determining simultaneously which model of the plurality of models best fits the respective time series forecast and forecasting simultaneously the future data based on the determined best fitting model and the respective current data. The method also includes returning, by the data processing hardware, to the user, the forecasted future data for each of the plurality of time series forecasts requested by the time series forecasting query.

Implementations of the disclosure may include on ore more of the following optional features. In some implementations, the time series forecasting request includes only a single query. In these implementations, the single query may include a Structured Query Language (SQL) query. Additionally or alternatively, the single query also includes a reference to three columns of a table. In some examples, the three columns of the table include a first column including timestamp data, a second column including the current data, and a third column including time series forecast identification data.

In some implementations, each model of the plurality of models for each respective time series forecast includes an auto regressive integrated moving average model. Training the plurality of models may include performing hyper-parameter tuning. In some examples, forecasting the future data includes modeling seasonal effects. Optionally, forecasting the future data includes modeling holiday-effects. In additional examples, forecasting the future data includes modeling drift. In some implementations, forecasting the future data includes performing anomaly detection. In some examples, determining which model of the plurality of models best fits the respective time series forecast includes determining which model has a lowest Akaike information criterion (AIC).

Another aspect of the disclosure provides a system for time series forecasting. The system includes data processing hardware and memory hardware in communication with the data processing hardware. The memory hardware stores instructions that when executed on the data processing hardware cause the data processing hardware to perform operations. The operations include receiving a time series forecasting query from a user. The time series forecasting query requests the data processing hardware to perform a plurality of time series forecasts. Each time series forecast is a forecast of future data based on respective current data. For each time series forecast of the plurality of time series forecasts requested by the time series forecasting query, the operations include simultaneously training a plurality of models for the respective time series forecast. The operations also include simultaneously determining which model of the plurality of models best fits the respective time series forecast and simultaneously forecasting the future data based on the determined best fitting model and the respective current data. The operations also include returning, to the user, the forecasted future data for each of the plurality of time series forecasts requested by the time series forecasting query.

Implementations of the disclosure may include on ore more of the following optional features. In some implementations, the time series forecasting request includes only a single query. In these implementations, the single query may include a Structured Query Language (SQL) query. Additionally or alternatively, the single query also includes a reference to three columns of a table. In some examples, the three columns of the table include a first column including timestamp data, a second column including the current data, and a third column including time series forecast identification data.

In some implementations, each model of the plurality of models for each respective time series forecast includes an auto regressive integrated moving average model. Training the plurality of models may include performing hyper-parameter tuning. In some examples, forecasting the future data includes modeling seasonal effects. Optionally, forecasting the future data may include modeling holiday-effects. In additional examples, forecasting the future data includes modeling drift. In some implementations, forecasting the future data includes performing anomaly detection. In some examples, determining which model of the plurality of models best fits the respective time series forecast includes determining which model has a lowest Akaike information criterion (AIC).

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A time series is a series of data points in chronological sequence (typically in regular intervals). Analysis on a time series may be applied to any variable that changes over time (e.g., industrial processes or business metrics). Time series forecasting is the practice of predicting (i.e., extrapolating) future data values based on past data values. Because so many prediction problems involve a time component, time series forecasting is an active area of interest. Specifically, time series forecasting has become a significant domain for machine learning. However, due to the inherent non-stationarity and uncertainty, time series forecasting remains a challenging problem.

With typical machine learning challenges, a model is trained until the model provides satisfactory results. The model is then used to make predictions on new data for a period of time until there is sufficient enough new data to warrant retraining the model with the additional new data. However, with time series forecasting, it may be beneficial to retrain a model when even a single new data point is received. From a practical point of view, deploying static models (as is traditional with many machine learning models) is ineffective for time series forecasting.

Implementations herein are directed towards a time series forecasting system that is capable of performing "large-scale" time series forecasting. That is, the system allows a user to fit and forecast many time series in parallel by submitting a single query. The system receives a time series forecasting request from a user that requests that the system perform a plurality of time series forecasts. For each of the plurality of time series forecasts, the system simultaneously trains a plurality of models and determines which model of the plurality of models best fits the respective time series forecast. The system forecasts future data based on each of the determined best fitting models and returns the forecasted future data for each requested time series forecast to the user.

Figure 1:
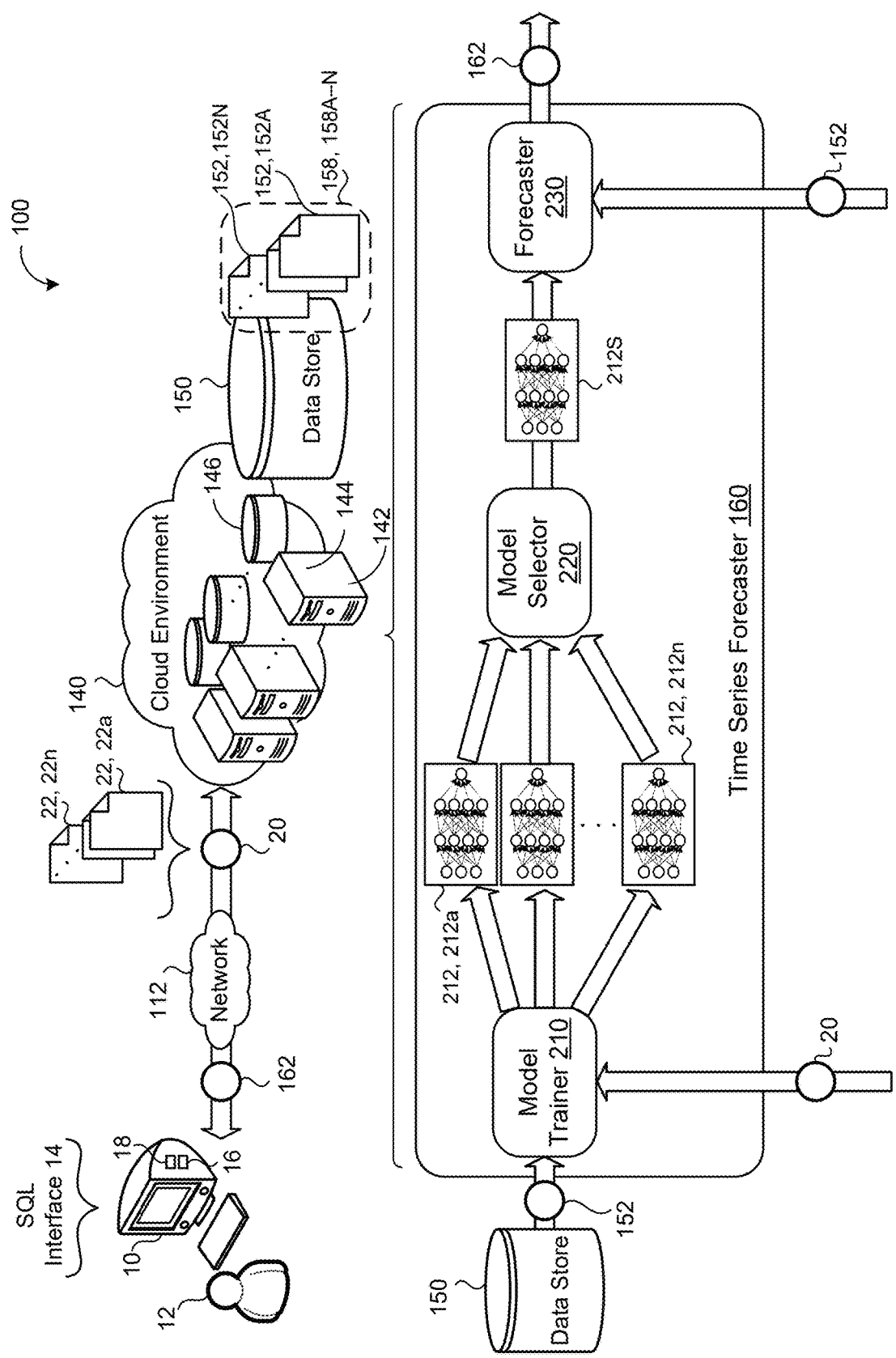
FIG. 1 is a schematic view of an example system for generating time series forecasts.
Figure 3:
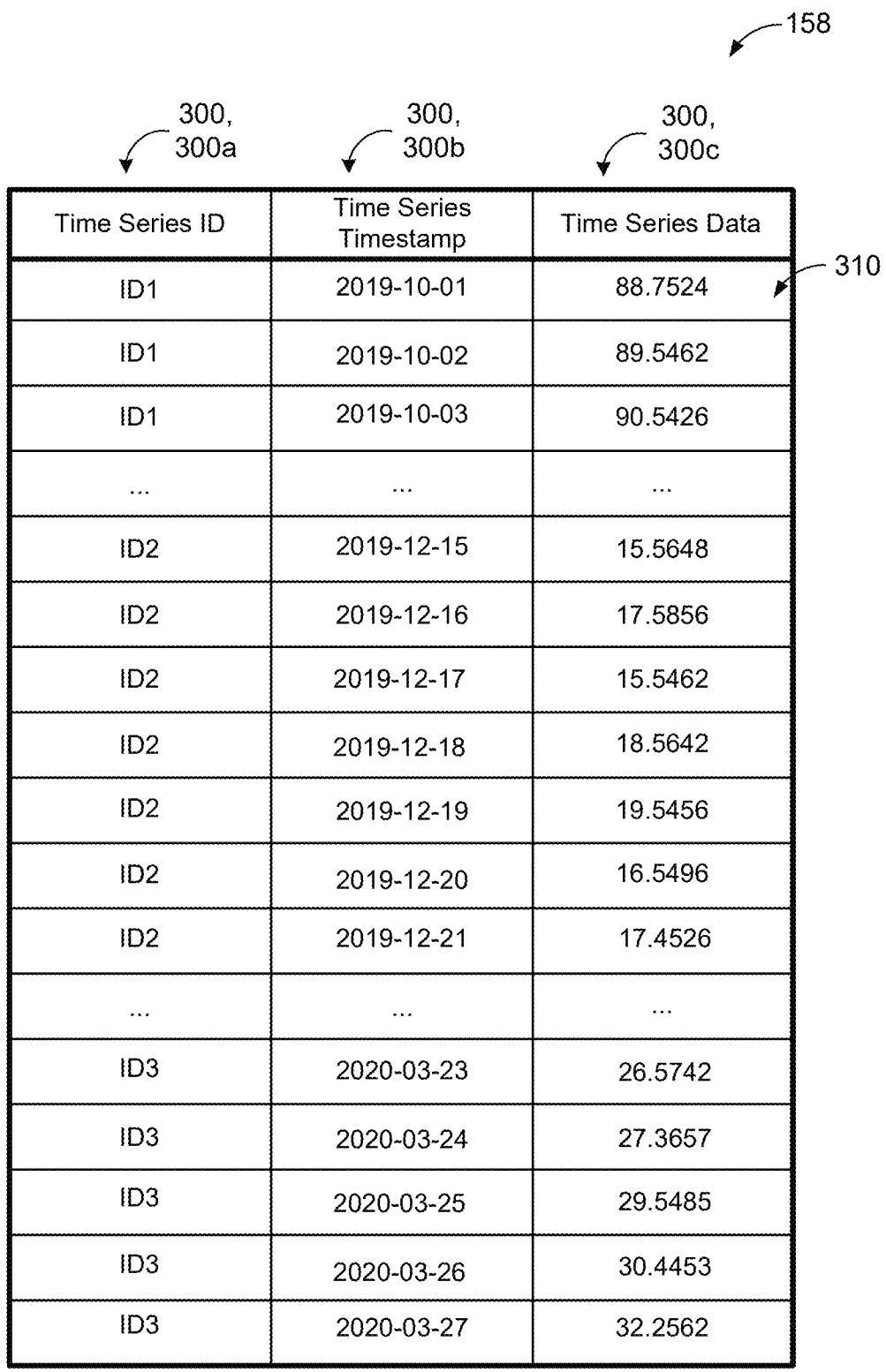
FIG. 3 is a schematic view of a table that includes a time series identification column.

Referring now to FIG. 1, in some implementations, an example time series forecasting system 100 includes a remote system 140 in communication with one or more user devices 10 via a network 112. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). A data store 150 (i.e., a remote storage device) may be overlain on the storage resources 146 to allow scalable use of the storage resources 146 by one or more of the clients (e.g., the user device 10) or the computing resources 144. The data store 150 is configured to store a plurality of data blocks 152, 152a-n within one or more tables 158, 158a-n (i.e., a cloud database) that each include a plurality of rows and columns 300, 300a-n (FIG. 3). The data store 150 may store any number of tables 158 at any point in time.

The remote system 140 is configured to receive a time series forecasting query 20 from a user device 10 associated with a respective user 12 via, for example, the network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware). The user 12 may construct the query 20 using a Structured Query Language (SQL) interface 14. Each time series forecasting query 20 requests one or more time series forecasts 22, 22a-n. Specifically, each time series forecast 22 requested by the query 20 is associated with a request for the remote system 140 to generate a forecast of future data 162 based current data 152.

The remote system 140 executes a time series forecaster 160 for forecasting and returning forecasted future data 162 to the user device 10. The time series forecaster 160 is configured to receive the query 20. As discussed in more detail below, a model trainer 210 generates and trains a plurality of forecasting models 212, 212a-n for each forecast request 22 simultaneously. As used herein, the terms forecast request 22 and time series forecast 22 may be used interchangeably. The model trainer 210 may train the forecasting models 212 on current data 152 (i.e., data blocks 152) retrieved from one or more tables 158 stored on the data store 150 that are associated with the requested time series forecasts 22. That is, the query 20 may include multiple time series forecasts 22 each requesting the remote system 140 to forecast future data based on current data 152 located in one or more tables 158 stored on the data store 150. Alternatively, the query 20 may include the current data 152. That is, the user 12 (via the user device 10) may provide the current data 152 when the current data 152 is not otherwise available via the data storage 150.

The model trainer 210 may generate and/or train each model 212 with different parameters. For example, the model trainer 210 may generate and train a plurality of autoregressive integrated moving average (ARIMA) models with different orders of the autoregressive models (i.e., the number of time lags and commonly represented as the parameter p), different degrees of differencing (i.e., the number of times the data has had past values subtracted and commonly represented as the parameter d), and an order of the moving-average model (i.e., a size of the moving average window and commonly represented as the parameter q). Using a combination of different parameters (e.g., parameters p, d, and q), the model trainer 210 generates a corresponding forecasting model 212 for each combination. Each model 212 is trained using the same data 152. One or more parameters may be configurable or partially-configurable by the user 12.

The model trainer 210 may perform hyper-parameter tuning (also known as hyper-parameter optimization) when generating and training the plurality of models 212. A hyper-parameter is a parameter that controls or adjusts the actual learning process while other parameters (e.g., node weights) are learned. For example, the model trainer 210 may perform hyper-parameter tuning on a data frequency and non-seasonal order parameters. As discussed in more detail below, the model trainer 210 may generate and train forecasting models 212 capable of modeling many different aspects of time series. For example, the forecast models 212 may account for seasonal effects, holiday effects, modeling drift, and anomalies.

A model selector 220 receives each trained model 212 to determine which model 212 best fits the data 152. Typically, machine learning models are trained on a training dataset and then evaluated on test dataset. However, because time series data frequently has a very limited dataset, the time series forecaster 160 may use the same data to both train the models 212 and evaluate the models 212 (i.e., forecast the future data 162). Thus, in some examples, the model selector 220 determines which model 212 results in a lowest Akaike information criterion (AIC). The AIC is an estimator of out-of-sample prediction error and thus may represent a relative quality of the corresponding model 212 relative to each other model 212 trained on the same data 152. The model selector 220 selects the best fitting model 212S (e.g., the model 212 with the lowest AIC) and sends the model 212S to a forecaster 230. This allows the model selector 220 to determine the best-fitting model 212 analytically without relying on empirical means (e.g., a separate testing dataset).

The forecaster 230, using the selected model 212S, forecasts future data 162 based on the current data 152. The forecaster 230 returns the forecasted future data 162 to the user 12 (via the user device 10). The user device 10 displays the forecasted data 162 as, for example, a graph. Each time series requested by the query 20 may be displayed on the same graph with user-configurable filters for controlling which portions of which time series are displayed. For example, the query 20 includes a request for ten time series forecasts 22. After receiving the future data 162, the user device 10 may display on a graph all ten time series forecasts simultaneously. The user may select which time series are viewable and zoom-in or zoom-out on the data as desired.

Figure 2:
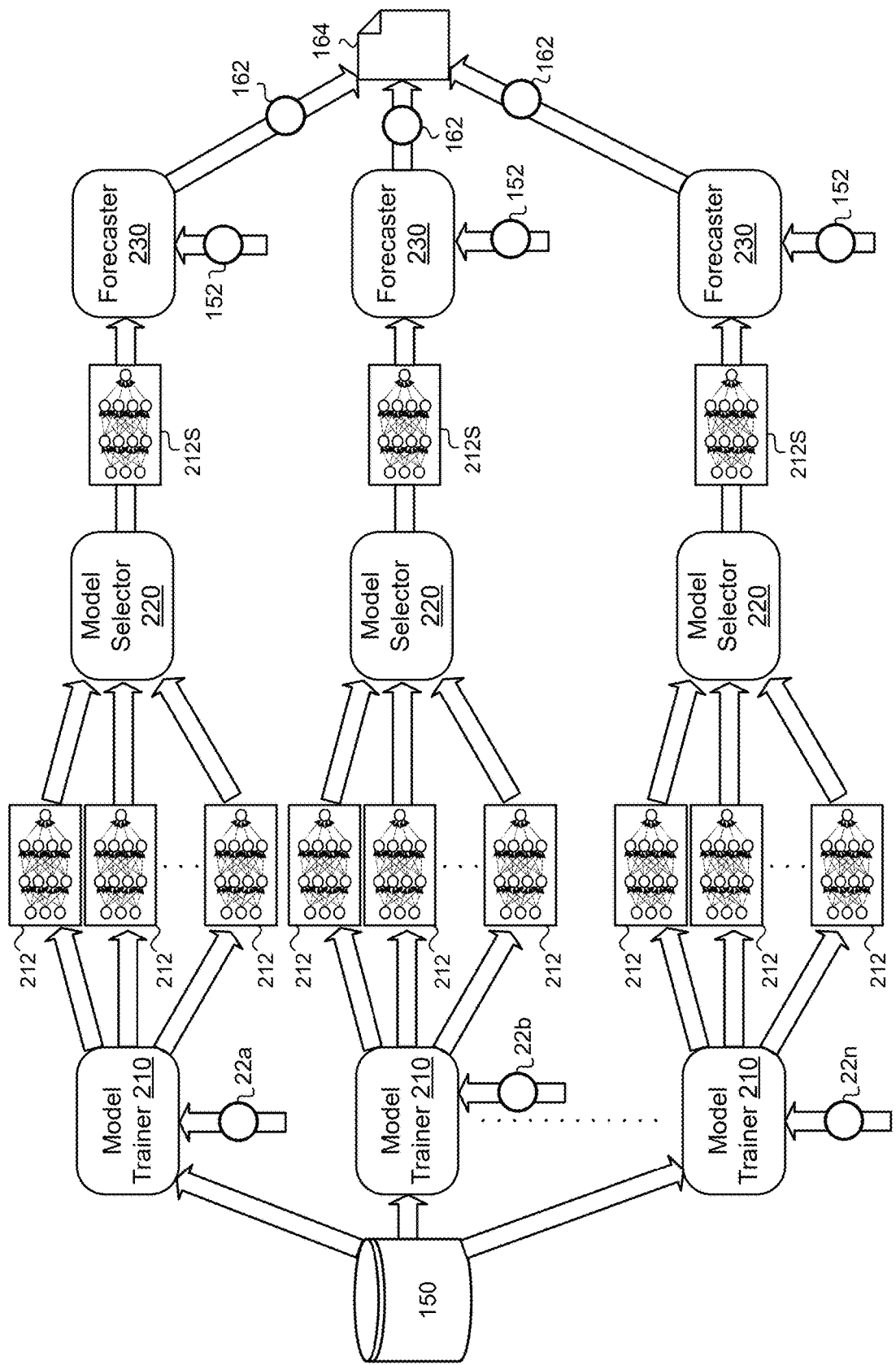
FIG. 2 is a schematic view of exemplary components of the system of FIG. 1.

Referring now to FIG. 2, in some examples, the query 20 requests the remote system 140 to perform a plurality of time series forecasts 22. In this instance, the model trainer 210 trains a plurality of models 212 for each of the plurality of time series forecasts 22 simultaneously. For example, when the query 20 includes ten time series forecasts 22 and the model trainer 210 trains forty models 212 per time series forecast 22, the model trainer 210 generates and trains four hundred (i.e., 40 multiplied by 10) models 212 simultaneously. As shown in FIG. 2, the time series forecaster 160 may replicate the model trainer 210 for each time series forecast 22 (i.e., ten replications of the model trainer 210 for ten forecast requests 22) requested by the query 20. The model selector 220 likewise determines the best fitting model 212S for the corresponding forecast request 22 from each set of models 212 simultaneously (e.g., via replication). The forecaster 230 may also forecast the future data 162 based on each of the selected models 212S simultaneously (e.g., via replication). The forecasted future data 162 from each of the selected models 212S may be included within a query response 164 that is returned to the user 12 via the user device 10. Thus, the user 12, with only a single query 20, may request a plurality of time series forecasts 22 and the time series forecaster 160 processes each of the time series forecasts 22 in parallel, greatly reducing the amount of time required to respond to the query 20.

Referring now to FIG. 3, in some implementations, the query 20 includes a reference to three columns 300, 300*a-c* of a table 158 stored on the data store 150. For example, one column 300*a* includes time series identification information, another column 300*b* includes time series timestamp data, and a third column 300*c* includes time series data. The time series timestamp column 300*b* includes the necessary time component of the time series. Each data element 310 of the time series timestamp column 300*b* represents a point in time associated with a respective time series data element 310 from the time series data column 300*c*. The time series forecaster 160 uses the time series timestamp column 300*b* and the time series data column 300*c* to train the forecasting models 212 and to forecast the future data 162.

In some examples, the time series timestamp column 300*b* and the time series data column 300*c* are associated with the time series identification (ID) column 300*a*. The time series ID column 300*a* identifies which portions of the time series timestamp column 300*b* and the time series data column 300*c* correspond to each of the plurality of time series forecasts 22 requested by the query 20. That is, the time series ID column 300*a* demarcates the time series timestamp column 300*b* and the time series data column 300*c* based on the plurality of time series forecast 22 requested by the query 20.

In the illustrated example, a time series ID of "ID1" demarcates a series of timestamp and data elements 310. Each timestamp and data element 310 associated with the time series ID "ID1" corresponds to one of the time series forecast 22 requested by the query 20. Similarly, a time series ID of "ID2" demarcates a series of timestamp and data elements 310 for a second time series data request 22 and a time series ID of "ID3" demarcates a series of timestamp and data elements 310 for a third time series. In this manner, the time series ID column 300*a* identifies the boundaries of each of the separate time series forecast 22 requested by the query 20. Thus, the user 12 may generate a single query (e.g., using the SQL interface 14) that provides an identifier of three columns 300 of a table 158 stored on the data store 150 that correspond to the time series ID column 300*a*, the time series timestamp column 300*b*, and the time series data column 300*c* to identify a plurality of requested time series forecasts 22 within the single query 20.

While FIG. 3 illustrates an explicit identification column 300*a* to provide a clear example, any column 300 in the table may serve as the time series identification column 300*a*. For example, a table 158 that includes data representative of metrics for a plurality of different offices may use an office location column as the time series identification column 300*a* to generate a plurality of time series forecasts 22 for each office location. As another example, a table 158 that includes data representative of weather statistics for different countries may use a column representing the country as the time series identification column 300*a* to generate a plurality of time series data forecasts 22 for each country. That is, the user 12 may generate a plurality of time series forecasts 22 based on any pre-existing column 300 in a table 158 without the need of generating a column 300 explicitly for the purpose of demarcating the desired time series.

Figure 4:
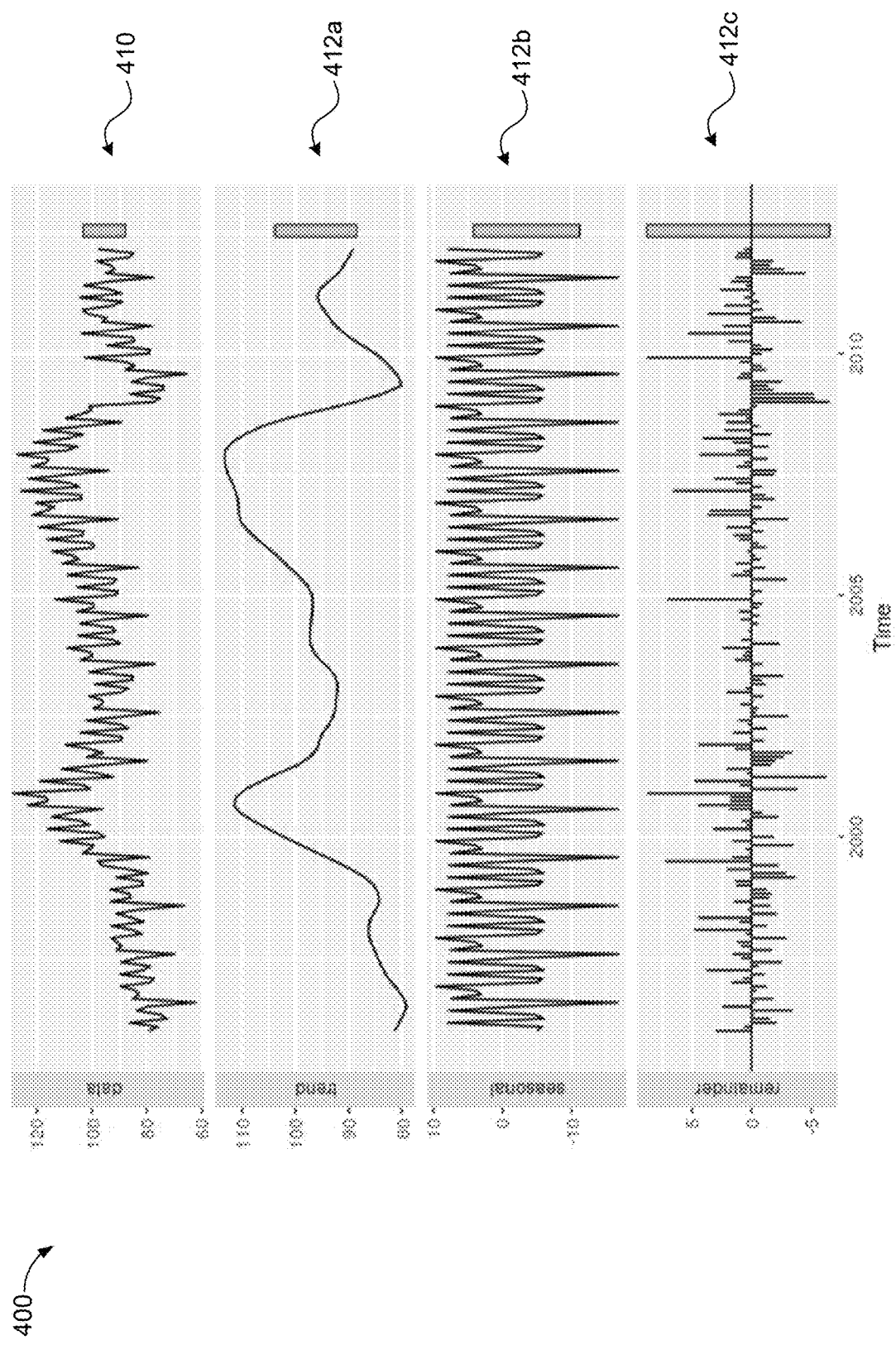
FIG. 4 is a plot of a time series and corresponding decomposition components of the time series.

Referring now to FIG. 4, a plot 400 illustrates an example time series 410 and corresponding components 412*a-c* of the time series 410. The time series 410 includes a series of data points (the y-axis) with respect to time (the x-axis). Here, the data is represented on the y-axis between approximately 60 and 140 while the x-axis ranges approximately from the year 1995 to the year 2015. The time series 410 is decomposed into a trend component 412*a*, a seasonal component 412*b*, and a remainder portion 412*c*. The trend component 412*a* represent trends in the data that move up or down in a reasonably predictable pattern. Here, the trend component 412*a* also includes cyclical variations that correspond to cycles (e.g., "boom-bust" cycles). The seasonal component 412*b* illustrates variations that repeat over a specific period (e.g., a day, week, month, etc.). For example, an increase in sales in December represents a seasonal effect of the seasonal component 412b. The remainder component 412c represents seemingly random residual fluctuations that do not fall under classifications of other components 412.

Figure 5:
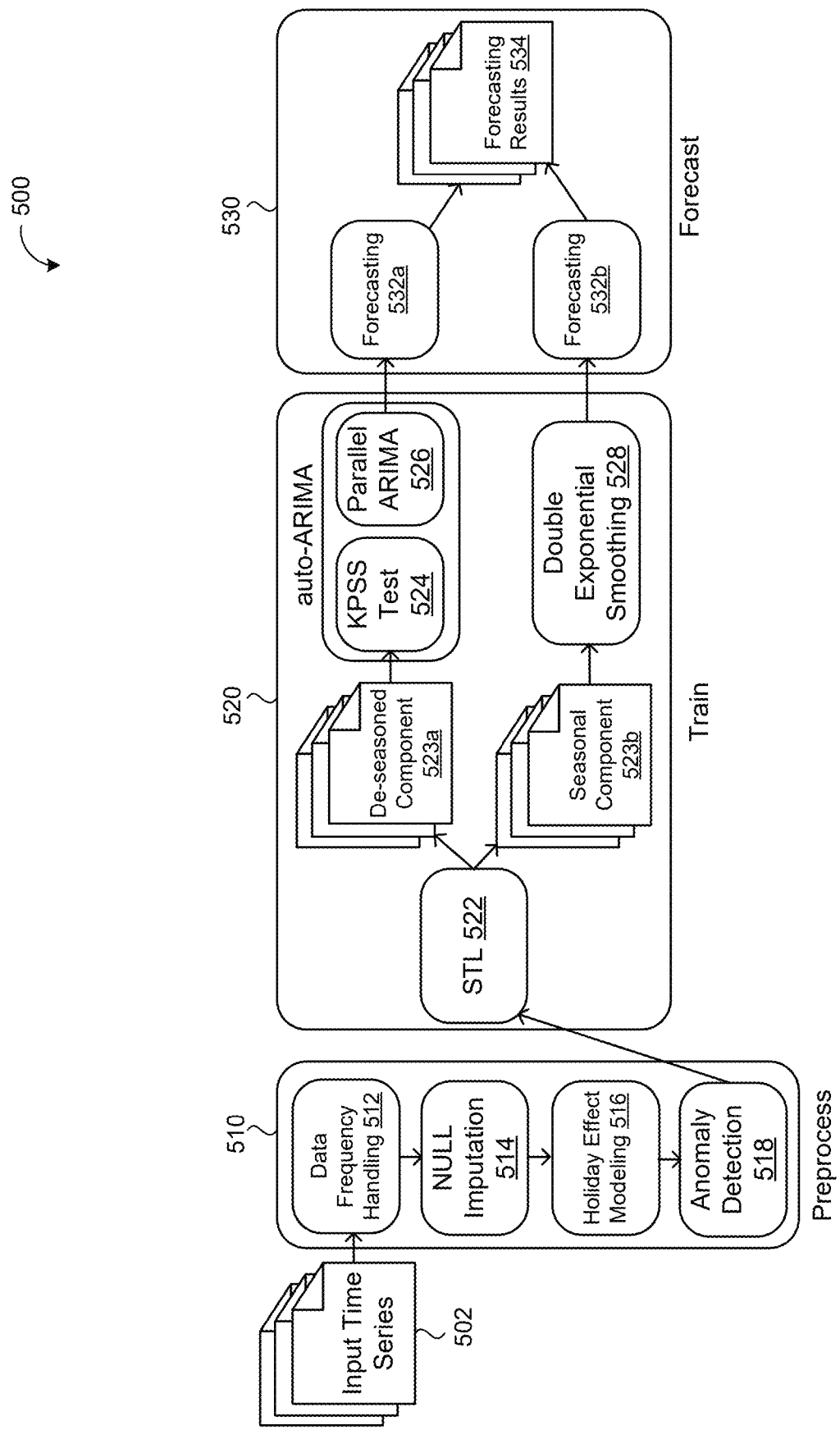
FIG. 5 is a schematic view of additional exemplary components of the example system of FIG. 1.

Referring now to FIG. 5, in some examples, an end-to-end time series forecaster 500 receives a plurality of input time series 502 (composed of, for example, data 152 stored on data store 150). The end-to-end time series forecaster 500 may include three primary stages: a preprocess stage 510, a training stage 520, and a forecasting stage 530. The preprocess stage 510 receives an input time series 502 and performs data frequency handling 512, NULL imputation 514 (i.e., determining and/or rejecting any nulls in the input time series 502), holiday effect modeling 516, and anomaly detection 518.

Holiday effects may play an important role in time series forecasting. For example, a time series representing sales for an online retailer may experience a significant surge in sales on "Black Friday." However, Black Friday does not have a fixed period as it falls on the day after Thanksgiving, which is the fourth Thursday of November. Thus, the effects are difficult if not impossible to take into account with seasonality modeling. Additionally, holiday effects may be mistaken for anomalies which may lead to undesired smoothing of the holiday effects. The holiday effects modeling module 516 accounts for these effects that otherwise are missed by seasonality modeling or mistakenly smoothed by anomaly detection.

After preprocessing, the training stage 520 begins with a seasonal and trend decomposition using local regression (STL) module 522 which generates a de-seasoned component 523a and a seasonal component 523b. The STL module 522 estimates nonlinear relationships and decomposes a time series into multiple components 412a-c (FIG. 4). The de-seasoned component 523a is processed via a Kwiatkowsi-Phillips-Schmidt-Shin (KPSS) test module 524 and generates a plural of ARIMA models in parallel at 526. The seasonal component 523b is passed to a double exponential smoothing module 528. In the forecast stage 530, the de-seasoned components 523a from the ARIMA models is forecast by a forecasting module 532a while the seasonal component 523b from the double exponential smoothing module 528 is forecast by a forecasting module 532b. The results from both the forecasting module 532a and the forecasting module 532b are combined to create forecasting results 534. The forecaster 500 may return the forecasting results 534 to the user 12 via the user device 10. The end-to-end time series forecaster 500 replicates the stages 510, 520, 530 for each input time series 502 such that each input time series is forecast simultaneously in parallel.

Figure 6:
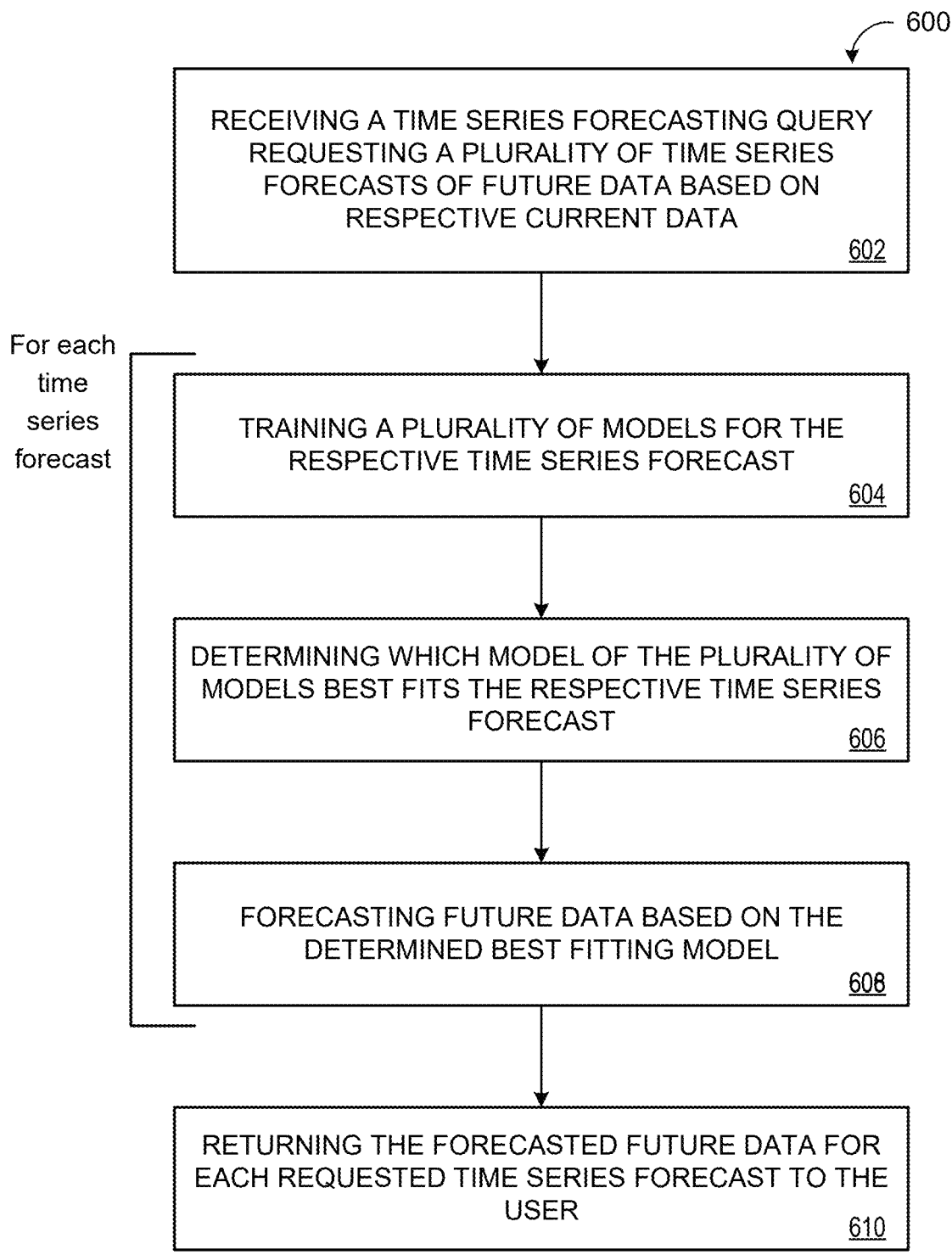
FIG. 6 is a flowchart of an example arrangement of operations for a method of generating time series forecasts.

FIG. 6 is a flowchart of an exemplary arrangement of operations for a method 600 for performing time series forecast. The method 600, at operation 602, includes receiving, at data processing hardware 144, a time series forecasting query 20 from a user 12 that requests the data processing hardware 144 to perform a plurality of time series forecasts 22. Each time series forecast 22 is a forecast of future data 162 based on respective current data 152.

For each time series forecast 22 of the plurality of time series forecasts 22, the method 600, at operation 604, includes simultaneously training, by the data processing hardware 144, a plurality of models 212 for the respective time series forecast 22 of the plurality of time series forecasts 22. At operation 606, the method 600 includes simultaneously determining, by the data processing hardware 144, which model 212S of the plurality of models 212 best fits the respective time series forecast 22 of the plurality of time series forecasts 22. At operation 608, the method 600 includes simultaneously forecasting, by the data processing hardware 144, future data 162 based on the determined best fitting model 212S and the respective current data 152. At operation 610, the method 600 includes returning, by the data processing hardware 144, to the user 12, the forecasted future data 162 for each of the plurality of time series forecasts 22 requested by time series forecasting query 20.

Figure 7:
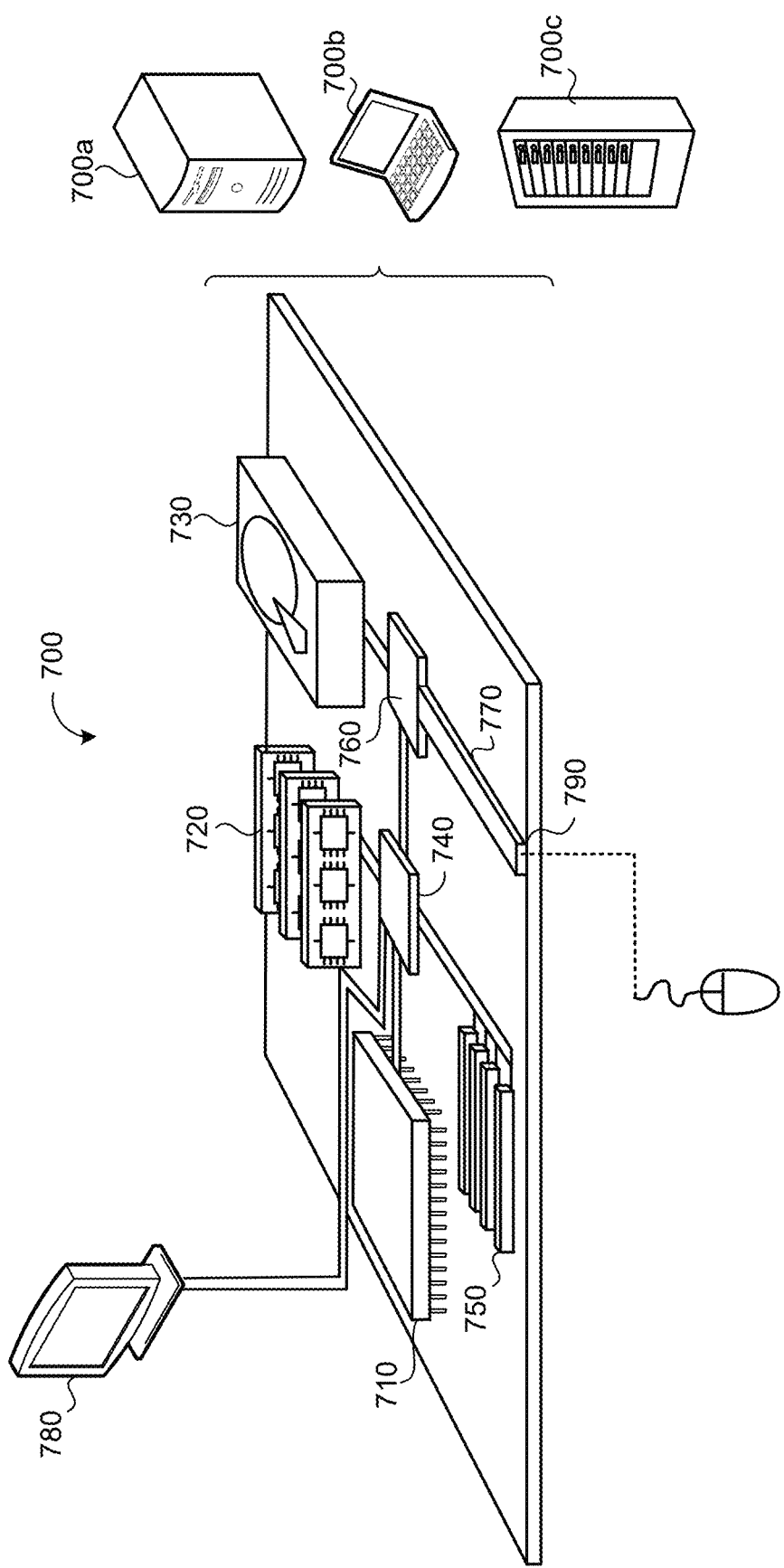
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
  receiving a time series forecasting query requesting a time series forecast, the time series forecast comprising a forecast of future data based on current data;
  training a plurality of machine learning models for the time series forecast using an order of a moving-average model, wherein:
    each respective machine learning model of the plurality of machine learning models is trained on the same data blocks of the current data using a different order of the moving-average model; and each machine learning model of the plurality of machine learning models is trained to predict the time series forecast based on the same data blocks of the current data;
for each respective model of the plurality of machine learning models, determining, using the current data, a respective prediction error of the respective machine learning model;
selecting, using the respective prediction error of each respective machine learning model, a single one of the plurality of machine learning models that best fits the respective time series forecast;
forecasting the future data based on the selected best fitting machine learning model and the current data; and
returning the forecasted future data for the time series forecast requested by the time series forecasting query.

2. The method of claim 1, wherein the operations further comprise using the respective prediction error of each respective machine learning model without relying on empirical means.

3. The method of claim 1, wherein the time series forecasting query comprises a Structured Query Language (SQL) query.

4. The method of claim 1, wherein the time series forecasting query comprises a reference to three columns of a table.

5. The method of claim 4, wherein the three columns of the table comprise:
a first column comprising timestamp data;
a second column comprising the current data; and
a third column comprising time series forecast identification data.

6. The method of claim 1, wherein each machine learning model of the plurality of machine learning models comprises an auto regressive integrated moving average model.

7. The method of claim 6, wherein training the plurality of machine learning models comprises performing hyperparameter tuning.

8. The method of claim 1, wherein forecasting the future data comprises modeling seasonal effects.

9. The method of claim 1, wherein forecasting the future data comprises modeling drift.

10. The method of claim 1, wherein selecting the one of the plurality of machine learning models that best fits the respective time series forecast comprises determining which machine learning model has a lowest Akaike information criterion (AIC).

11. A system comprising:
data processing hardware; and
memory hardware in communication with the data processing hardware, the memory hardware storing instructions that, when executed on the data processing hardware, cause the data processing hardware to perform operations comprising:
receiving a time series forecasting query requesting a time series forecast, the time series forecast comprising a forecast of future data based on current data;
training a plurality of machine learning models for the time series forecast using an order of a moving-average model, wherein:
each respective machine learning model of the plurality of machine learning models is trained on the same data blocks of the current data using a different order of the moving-average model; and
each machine learning model of the plurality of machine learning models is trained to predict the time series forecast based on the same data blocks of the current data;
for each respective model of the plurality of machine learning models, determining, using the current data, a respective prediction error of the respective machine learning model;
selecting, using the respective prediction error of each respective machine learning model, a single one of the plurality of machine learning models that best fits the respective time series forecast;
forecasting the future data based on the selected best fitting machine learning model and the current data; and
returning the forecasted future data for the time series forecast requested by the time series forecasting query.

12. The system of claim 11, wherein the operations further comprise using the respective prediction error of each respective machine learning model without relying on empirical means.

13. The system of claim 11, wherein the time series forecasting query comprises a Structured Query Language (SQL) query.

14. The system of claim 11, wherein the time series forecasting query comprises a reference to three columns of a table.

15. The system of claim 14, wherein the three columns of the table comprise:
a first column comprising timestamp data;
a second column comprising the current data; and
a third column comprising time series forecast identification data.

16. The system of claim 11, wherein each model of the plurality of machine learning models comprises an auto regressive integrated moving average model.

17. The system of claim 16, wherein training the plurality of machine learning models comprises performing hyperparameter tuning.

18. The system of claim 11, wherein forecasting the future data comprises modeling seasonal effects.

19. The system of claim 11, wherein forecasting the future data comprises modeling drift.

20. The system of claim 11, wherein selecting the one of the plurality of machine learning models that best fits the respective time series forecast comprises determining which machine learning model has a lowest Akaike information criterion (AIC).

* * * * *